(12) United States Patent
Steer et al.

(10) Patent No.: US 6,873,612 B1
(45) Date of Patent: Mar. 29, 2005

(54) METHODS AND DEVICES FOR ASYNCHRONOUS OPERATION OF A CDMA MOBILE COMMUNICATION SYSTEM

(75) Inventors: David G. Steer, Nepean (CA); Amir Bigloo, Vancouver (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/182,655

(22) Filed: Oct. 30, 1998

Related U.S. Application Data

(60) Provisional application No. 60/063,588, filed on Oct. 30, 1997.

(51) Int. Cl.[7] .......................... H04B 7/216; G06F 11/00
(52) U.S. Cl. ....................... 370/342; 370/335; 714/61; 455/450
(58) Field of Search ................................ 370/203, 209, 370/310.2, 320, 322, 342, 441, 335, 140, 331; 375/130, 140, 145, 149, 343, 142, 150; 455/414, 436, 442, 450, 453; 714/761

(56) References Cited

U.S. PATENT DOCUMENTS

| | | | | |
|---|---|---|---|---|
| 3,872,445 A | * | 3/1975 | Pease ........................ | 700/90 |
| 5,469,468 A | * | 11/1995 | Schilling ..................... | 375/130 |
| 5,553,076 A | * | 9/1996 | Behtash et al. ............. | 370/311 |
| 5,812,543 A | * | 9/1998 | Sugita ........................ | 370/335 |
| 6,078,572 A | * | 6/2000 | Tanno et al. ................ | 370/335 |

OTHER PUBLICATIONS

T.S. Rappaport, "CDMA Digital Cellular Standard (IS–95)", Wireless Communications Principles and Practice, IEEE Press 1996, Chapter 10, pp. 519–533.

J.D. Gibson, "CDMA Technology and the IS–95 North American Standard", The Mobile Communications Handbook, IEEE Press 1996, Chapter 27, pp. 430–448.

* cited by examiner

*Primary Examiner*—Afsar Qureshi
(74) *Attorney, Agent, or Firm*—Foley & Lardner LLP

(57) ABSTRACT

A CDMA mobile communication system is operated asynchronously while using common forward channel PN and Walsh codes. Such operation is enabled by devices in the system that provide measurements of the instantaneous offsets between PN codes of neighboring base stations. Knowledge of instantaneous offsets may be maintained and used to identify base station signals to enable handovers to neighboring base stations. Instantaneous offsets may also be processed over time to identify states of imminent collision so that corrective action can be taken to avoid or minimize collision effects.

26 Claims, 13 Drawing Sheets

METHODS AND DEVICES FOR ASYNCHRONOUS OPERATION OF A CDMA MOBILE COMMUNICATION SYSTEM

RELATED APPLICATIONS

The present application claims priority from U.S. provisional application Ser. No. 60/063,588, filed 30 Oct. 1997, the entirety of which is incorporated herein by reference.

FIELD OF THE INVENTION

The invention pertains to the field of mobile communication systems. The invention addresses the problem of providing an asynchronous code division multiple access (CDMA) mobile communication system in which the forward channels are modulated by a common psuedorandom noise (PN) code.

BACKGROUND OF THE INVENTION

Code division multiple access (CDMA) systems such as those conforming to the TIA standard IS-95 are designed to operate synchronously, such that the transmissions of each base station and mobile portable unit are produced in accordance with a common timing reference clock. In current deployments, synchronization is achieved through the use of Global Positioning System (GPS) receivers at each base station. These receivers extract frequency and timing information from the GPS satellite navigation system and use the information to control the timing of the base station transmissions. While this is practical in some regions (such as the United States), some mobile network operators are adverse to the use of GPS for synchronization because control of the GPS system resides with the US Department of Defense. In addition, planning, installation and maintenance of the GPS receivers at each cell site is costly.

There is accordingly a desire among the operators for a CDMA system that may be operated asynchronously. Asynchronous operation is also desirable for new systems derived from the IS-95 standard or "third generation" CDMA mobile radio systems.

However, asynchronous operation entails signal coding problems that are not anticipated in the IS-95 standard. In the CDMA system, forward channel messages are transmitted in a common frequency band, with each message being modulated by two unique codes that distinguish the message from others in the channel. The first of the codes is a repeating pseudo-noise (PN) code having low autocorrelation that is applied to every each message broadcast by a base station. The PN code is 32,768 chips in length and is repeated every 26.67 ms, or approximately 75 times every two seconds. The PN code is shared in common by all base stations of the system, but each base station begins its modulation cycle at a unique starting point in the PN sequence, sometimes referred to as its "offset". Since the system operates synchronously, the offsets between base stations is essentially static. Therefore the messages broadcast by a given base station can be recognized through correlation with the PN code having that base station's predetermined offset. A second code that modulates each message is a 64 chip code known as a Walsh code. Each message broadcast by a base station is encoded with an individual Walsh code selected from a set of mutually orthogonal Walsh codes. Therefore, a particular message from a base station can be recognized by correlating the PN-demodulated signal from that base station with the Walsh code of the message.

Operation of IS-95 CDMA systems depends on the static nature of the PN code offsets. If base stations are operated asynchronously, i.e. without a common timing reference, differences in oscillator rates will cause the relative PN offsets between base stations to drift over time. This leads to two problems that are not anticipated by the IS-95 standard. First, in standard systems the signals of base stations are initially recognized by their predetermined offsets, and so functions such as handover of a mobile handset from one base station to another are premised on the ability of the system to determine the identities of base stations detected by a handset by comparing the offset of the detected signal with a list of the predetermined system offsets. However, in an asynchronous system, offsets are continually changing, and so there is no static offset by which to identify base station signals.

Further, the drift of offsets in an asynchronous system inevitably leads to states of "collision", during which adjoining base stations are modulating their signals with the same portion of the common PN code at essentially the same time. Under these circumstances, a receiver that is within range of both base stations and being served by either will demodulate both the signal from its serving base station and any signal from the other base station that is modulated using the same Walsh code that it is tracking. This results in a degradation or disruption of service for the receiver that continues until the signals have drifted apart to a state of non-collision.

If left uncorrected, collisions among signals from asynchronous base transceiver stations occur periodically, with the period between collisions being of the order of several hours. The IS-95 PN timing offsets are in steps of 26 milliseconds, and so collision is possible each time the timing of a base station drifts by this amount. Assuming that an unsynchronized base station employs an ovenized crystal oscillator with a stability of $10^{-8}$ or better (such accuracy is needed to maintain the radio frequency transmissions within the required limits), a base station will complete one full cycle of drift in approximately 1.5 days. It may be expected that, as there are typically a group of base stations in a region, with a number of overlapped coverage areas, there will be several PN collisions within each drift cycle.

Further explanation of CDMA mobile communications may be found in the books by Theodore S. Rappaport: "Wireless Communications Principles and Practice", IEEE Press 1996, ISBN 0-7807-1167-1 (Chapter 10 pages 519–533) and by Gerry D. Gibson: "The Mobile Communications Handbook", IEEE Press 1996, ISBN 0-8493-8573-3 (Chapter 27 pages 430–448). The IS-95 CDMA standard may be found in the publication by the Telecommunications Industry Association: "Mobile Station-BaseStation Compatibility Standard for Dual-Mode Wideband Spread Spectrum Cellular System", 1995 TIA/EIA/IS-95-A.

SUMMARY OF THE INVENTION

In light of the problems inherent in conventional systems as described above, it is an object of the invention to provide a CDMA communication system having asynchronous base transceiver stations that share a common PN code on the forward channels.

It is a further object of the invention to provide a CDMA communication system that provides soft handovers of mobile handsets between asynchronous base transceiver stations that share a common PN code on the forward channels.

It is a further object of the invention to provide a CDMA communication system that avoids or minimizes the impact of signal collisions between asynchronous base transceiver stations that share a common PN code on the forward channels.

It is a further object of the invention to provide an asynchronous CDMA mobile communication system that detects imminent signal collisions and initiates corrective action in the system to avoid or minimize the impact of the signal collision.

The invention allows a CDMA mobile communication system to be operated asynchronously while using common forward channel PN and Walsh codes. Such operation is enabled by devices in the system that provide measurements of the instantaneous offsets between PN codes of neighboring base stations. Knowledge of instantaneous offsets may be maintained and used to identify base station signals to enable handovers to neighboring base stations. Instantaneous offsets may also be processed over time to identify states of imminent collision so that corrective action can be taken to avoid or minimize collision effects. Various aspects of the invention are embodied in a variety of network configurations, network processes, network devices, and network device processes.

A first type of network device embodying the invention monitors signals from two or more base stations to determine the instantaneous PN code offset between base station pairs. The information provided by this device may be used by a related network device to maintain a current list of base station offsets. This information may be provided to mobiles to simplify the process of searching for signals of neighboring base stations for handover, or may be maintained in the network and used to identify base stations from offset measurements provided by pilot search results from a mobile handset. This information may also be used to identify imminent states of collision.

A related type of network device receives information provided by a device as described above and maintains a current map of relative offsets among base stations of the asynchronous system. This map may be used to provide a current neighbor set to a mobile handset that requires such information for performing a search for handover signals. The map may also be used to identify a base station based on an instantaneous offset measurement of its signal with respect to a known reference signal.

A further type of network device embodying the invention searches for base station signals within a small range of instantaneous PN offsets relative to a reference base station. This type of device looks for signals having offsets that are very close to that of a reference base station and reports such signals when they are detected. The information provided by this device over time may be processed to identify base station signals that are moving toward a state of collision with the reference base station. This type of device may be implemented as a dedicated device or may be implemented through appropriate control programming in a mobile handset.

A related type of network device in accordance with the invention is a collision control device that processes measurements of offsets between base stations to determine whether signals are drifting together or apart, and to determine whether signals have drifted close enough to be in a state of imminent collision. Such a device may further operate to initiate corrective action when a state of imminent collision is detected. Corrective action may involve changes in the oscillator speed of one of the base stations to reverse the direction of drift or to cause the collision to pass quickly. Alternatively, corrective action may involve soft handover of affected handsets to the colliding base station for the duration of the collision state. Soft handovers may be accompanied by changes in oscillator speed where available. Soft handovers may also be accompanied by suspension of pilot and paging channel signals to prevent additional handsets from entering the network during the state of collision.

A further network device in accordance with the invention is a base transceiver station (BTS) that is enabled to take corrective action in the event of an imminent collision. A BTS may be provided with a secondary oscillator that oscillates at a different rate than the nominal network standard rate of the base station's default oscillator. In response to commands from a collision control device, the BTS may switch to the secondary oscillator, causing the signals to avoid a collision or to shorten the length of a collision. A BTS may similarly be provided with an adjustable oscillator and a frequency adjustment controller for controlling the rate of the oscillator in accordance with commands from a collision control device. In response to commands from the collision detection device, the BTS may adjust the rate of its oscillator by an appropriate amount so that an imminent collision is avoided, for example, by reversing the direction of signal drift.

An alternative BTS in accordance with the invention has the capability of transmitting the same signals in two different frequency bands. When a collision is imminent for one of its mobiles, the base station begins to produce duplicate versions of each of its signals in the second frequency band. Mobiles are then handed over to their signals in the second band.

An alternative BTS in accordance with the invention has the capability to transmit using two different PN offsets. When a collision is imminent for one of its mobiles, the base station begins to produce duplicate versions of each of its signals using the second offset. Mobiles are then moved to the signal having the second offset through a soft handover procedure.

The invention further encompasses processing methods, system configurations, and particular device implementations in accordance with devices of the types described above.

DESCRIPTION OF THE DRAWINGS

The invention will be further understood through reference to the description of preferred embodiments provided below in conjunction with the drawings, in which.

DETAILED DESCRIPTION OF THE INVENTION AND PREFERRED EMBODIMENTS THEREOF

Figure 1:
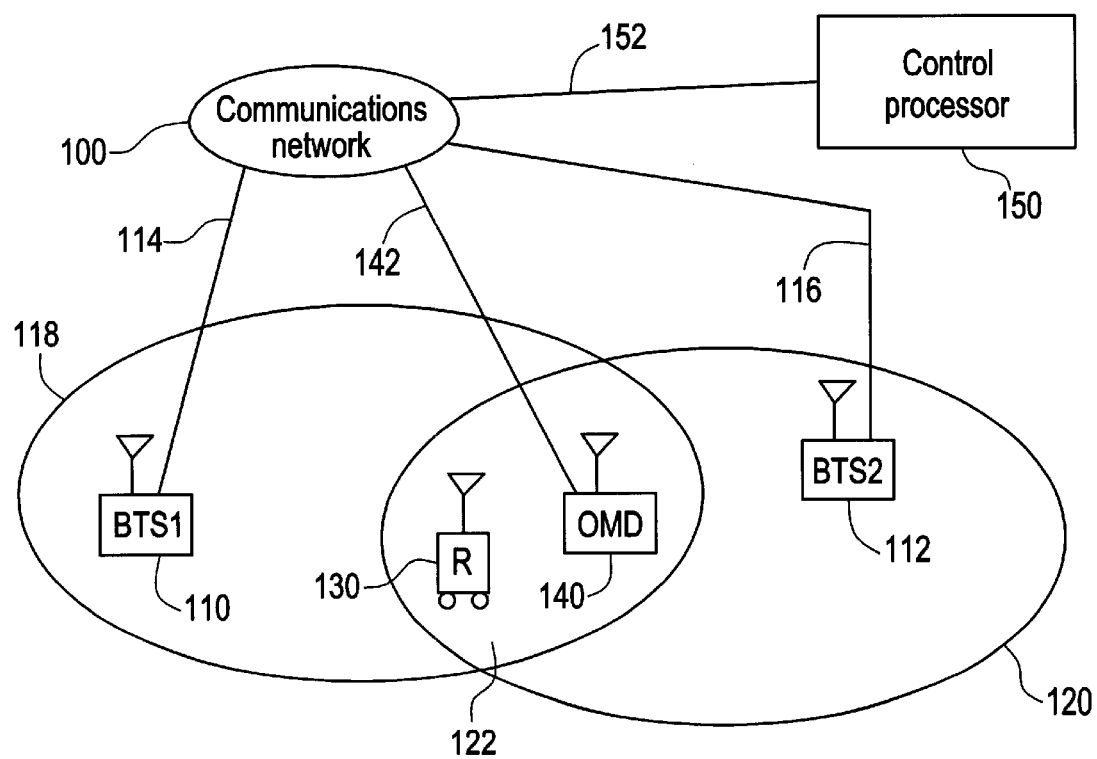
FIG. 1 shows a basic asynchronous CDMA communication system in accordance with the invention.

Reference is made first to FIG. 1, which illustrates an exemplary asynchronous CDMA mobile communication system in accordance with the invention. As seen in FIG. 1, asynchronous base transceiver stations 110, 112 are connected by communication links 114, 116 to a communications network 100 that includes base station controllers, switches and further communication links (not individually illustrated). Each BTS 110, 112 provides coverage over geographic ranges that are represented in FIG. 1 in an idealize fashion by respective ovals 118, 120. Of course, in real deployments the range of coverage provided by base stations varies widely in accordance with many environmental and device-related factors. As further shown in FIG. 1, the areas of coverage 118, 120 include an overlap region 122. Accordingly, a receiving device in the area of overlap such as mobile receiving device 130 will be able to receive signals from both base transceiver stations, and may be subject to the effects from collisions of their signals.

Further shown in FIG. 1 is an offset monitoring device 140 that is deployed in the region of overlap between the base transceiver stations 110, 112. The offset monitoring device receives signals from the base stations 110, 112, and from these signals it determines the instantaneous offset between the PN codes of the forward channels provided by the base stations. These measurements are made accessible to other devices associated with the network through a communication link 142. This link may be wired as illustrated, or may be established through a radio signaling channel to the base stations 110, 112 using standard system messaging capabilities.

Figure 2:
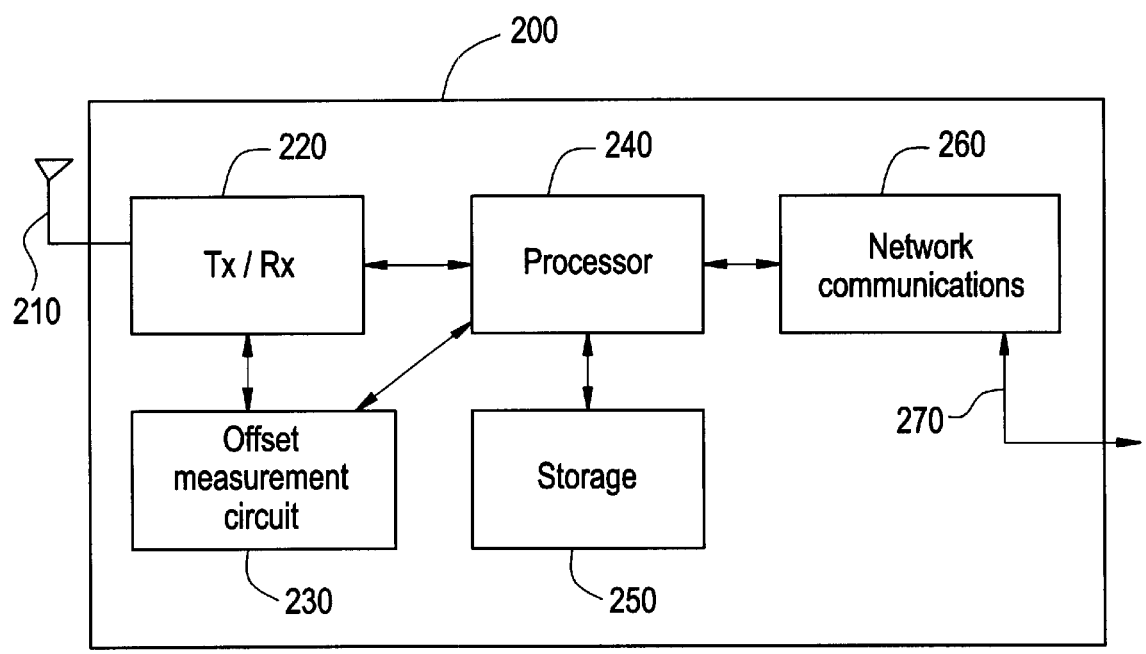
FIG. 2 shows an offset monitoring device in accordance with the invention.

FIG. 2 shows a basic block diagram for an offset monitoring device. The offset monitoring device has an antenna 210 for receiving signals from base transceiver stations. These signals are received by a transceiver unit 220 and communicated to an offset measuring circuit 230 (described in more detail below) and a processor 240. The offset measurement circuit 230 is controlled by the processor 240 to provide offset measurements. The offset measurements may be stored in a storage 250 and communicated to other network devices over a communication link 270 by means of a network communications device 260. The communication link may be wired or may use a radio signaling channel of the system, as discussed with respect to FIG. 1.

Figure 3:
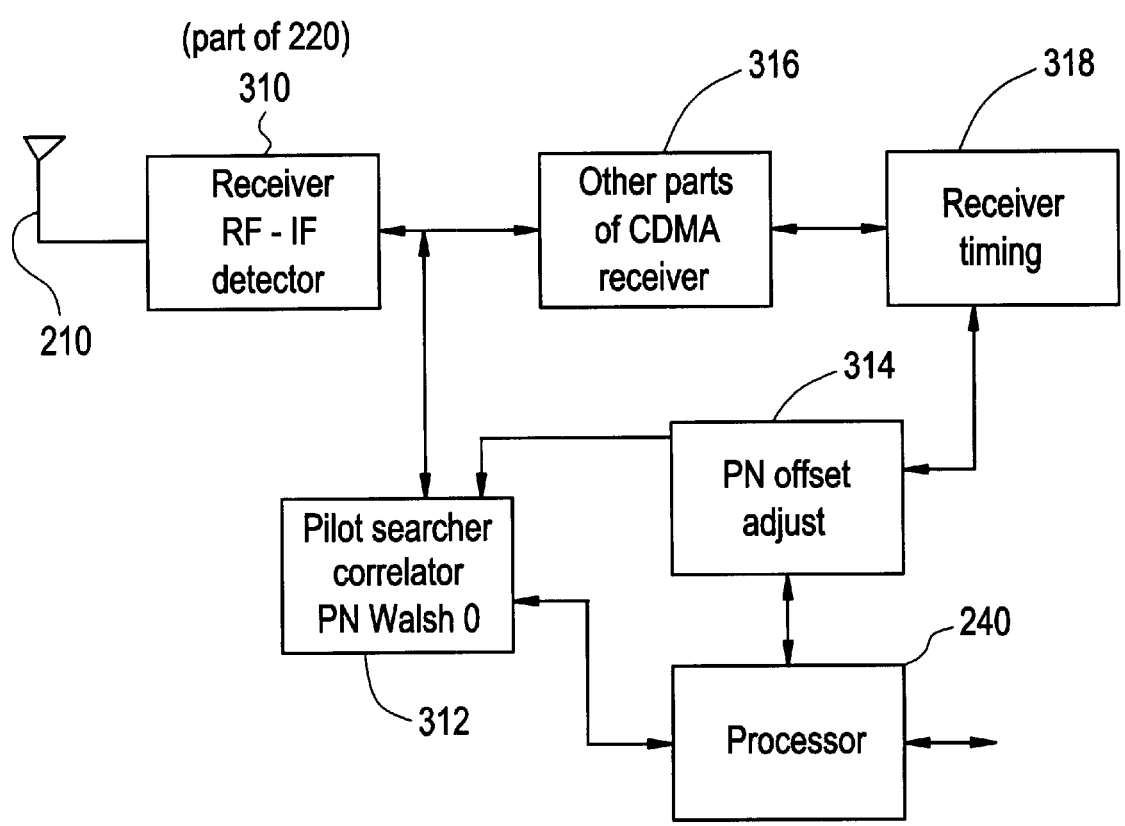
FIG. 3 shows an offset measurement circuit for an offset monitoring device in accordance with the invention.

FIG. 3 illustrates the arrangement and operation of an exemplary offset measurement circuit for use in an offset monitoring device. The circuit uses a pilot searcher correlator 312 such as the type found in mobile handset receivers. The function of the pilot searcher correlator 312 is to correlate the PN code with a received signal provided by an RF-IF detector section 310 (which is typically part of Tx/Rx unit 220 shown in FIG. 2). The portion of the PN code that is correlated against the signal is controlled by a PN offset adjust circuit 314 that selects the offset of the PN code relative to a reference offset. The PN code offset may be generated, for example, by loading appropriate values from a state table into the shift register that produces the PN code. In current systems the pilot signal is used by receivers to sense the coverage region of the base station, to determine its signal strength and to determine the PN offset of the base station. The pilot signal is modulated by Walsh code zero, which does not alter the basic PN sequence. Accordingly, the PN sequence offset between two base stations may be measured by receiving and comparing the pilot signals of the base stations. The elements of the offset measurement circuit are controlled by the processor 240 in accordance with appropriate control programming. The PN offset adjust circuit receives its reference timing from the receiver timing circuit 318.

Figure 3A:
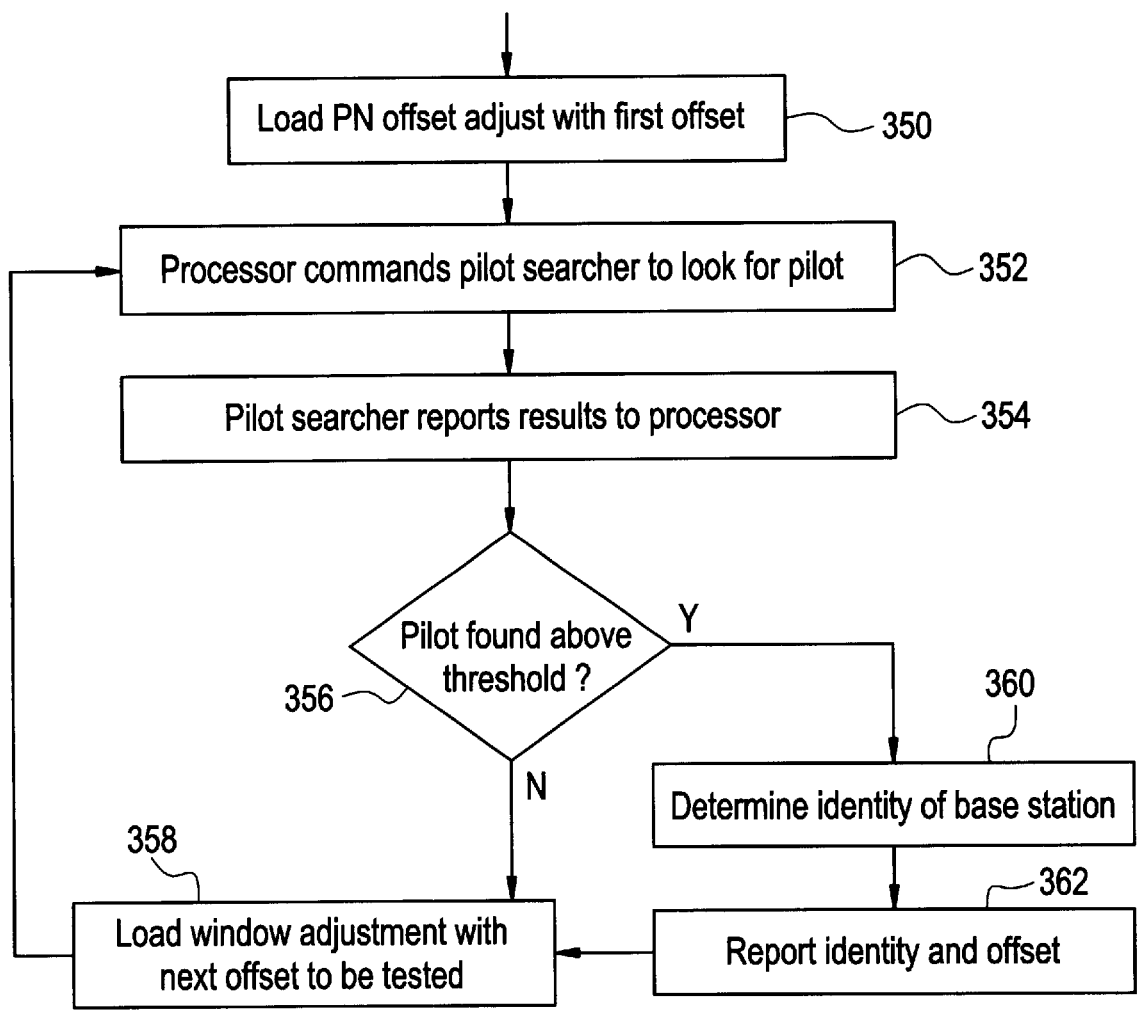
FIG. 3a shows a process for operating an offset monitoring device in accordance with the invention.

A process for operating an offset monitoring device is shown in FIG. 3a. As shown in FIG. 3a, a first PN offset relative to the reference signal is loaded 350 to the PN adjust circuit by the processor 240. The processor then commands 352 the pilot searcher to look for a pilot signal using the PN code generated in accordance with the PN offset adjust circuit. The pilot searcher subsequently reports 354 results to the processor. The pilot searcher will typically report the strength of the received pilot and the ratio of the pilot signal to the received noise. These measurements enable the processor to reject pilot signals that are too weak or too corrupted by noise and interference. The processor accordingly examines the measurements and determines 356 whether any pilot the above noise threshold is found. If no pilot is found, the PN offset adjust circuit is loaded 358 with the next offset to be tested. If a pilot is found, the identity of the base station is determined 360. Typically this information may be determined by decoding the synchronization channel (Walsh code 32 in TIA standard IS-95) for the colliding base station, which includes system identification information that allows the identity of the base station to be determined. However, in some cases it may be necessary for the collision detection device to decode the paging channels (Walsh codes 1–7 in TIA standard IS-95) to learn the full identity of the base station. The identity of the base station is then reported 362 along with its relative offset, and, optionally, its power (reporting of these quantities is addressed further below). The PN offset adjust circuit is then loaded 358 with the next offset to be tested.

The search pattern used by the offset monitoring device may be provided in accordance with the function that it is to provide. Where the device is deployed for the purpose of detecting the instantaneous offsets of all available signals, then the offset may be simply incremented in a sequential fashion so that the full PN code is repeatedly tested. Increments of two or three chips will generally be sufficient.

Alternatively, the search pattern may be focused on identifying whether signals from neighboring base transceiver stations are offset from the PN code of a reference receiver within a range that indicates the possibility of collision. In this case, it is preferable to test signals at successively greater offsets from the offset of the reference base station, so that those nearest to collision are identified earliest. To begin such a search pattern, it is desirable to start with an offset that is a sufficient distance from the offset of the serving BTS so that the search will avoid multipath transmissions from the serving BTS. A distance of 32 chips on either side of the reference offset will generally be sufficient. From that point, the window is moved outward in increments of 2–3 chips, which will generally be sufficient to ensure that at least one of the multipath transmissions from a nearby base station will be detected. To ensure that all possible colliding signals are detected, the offset is shifted back and forth with respect to the reference signal offset in an ever widening pattern. The desirable outward extent of the search will be dependent upon many factors related to oscillator stability and the length of time for which each offset is searched. As a general matter it should be sufficient to search outward to a distance of 128 chips (approximately 104 microseconds for TIA standard IS 95) in either direction from the offset of the reference signal.

While an offset monitoring device of the latter type may be implemented as a dedicated device, its physical elements are typically found in a mobile handset, and so a device of this type may be implemented in a mobile handset through the addition of appropriate control programming. In such an implementation, the pilot searcher correlator of the rake receiver of the mobile handset may be utilized to search for colliding signals in the vicinity of a known nearby base station, as described above. To save resources, the offset monitoring function may be made dependent upon requests from a control processor such as a collision control device (discussed below). Mobiles in overlap coverage regions can be identified, as they will report nearly equal strength of the pilot signals. It is noted however that if a mobile detects a signal in the search range, then during the interval that the receiver is decoding the identity of the colliding base station from the synchronization channel, it will be unable to receive signals from another base station. Therefore, if a call is active, received speech will be temporarily suspended. However, as the time interval to identify the base station is relatively short, this suspension of reception will cause only a momentary interruption to received speech.

The information determined by the offset monitoring device will generally be reported to a device implemented on a control processor associated with the network, such as control processor 150 of FIG. 1, that is programmed to utilize the information in the course of performing network functions. Of course, a variety of control processors are distributed about the typical CDMA communication network, and so the devices described below may be integrated into any such processors.

A first such type of device may be provided to facilitate handovers of mobile handsets between asynchronous base transceiver stations. As discussed above, the standard CDMA handover process requires a mobile handset to locate a pilot signal having sufficient strength to act as a serving base station. This may be done through a search of all possible offsets, or it may be done by searching specific known offsets of base transceiver stations.

In accordance with the invention, a neighbor set may be maintained by a control processor using offset measurements made by offset monitoring devices of the system. The neighbor set is compiled from offset measurements provided by offset monitoring devices of the types described above. Accordingly, in the devices described above, the offset measurements and related information are reported to the device maintaining the neighbor set. In this manner the neighbor set is continually updated.

The neighbor set may be utilized for soft handover in either of two ways. In a first manner, when soft handover is initiated by a mobile handset or by a serving base station, the mobile handset may be provided with the offsets of its neighboring base stations. These offsets may then be searched and measured for signal strength so that an appropriate base station for handover may be identified. Alternatively, if the mobile handset searches for pilots simply by scanning all offsets, the neighbor set may be used to identify the pilots detected by the mobile handset using the unique offset of each base station.

Figure 4:
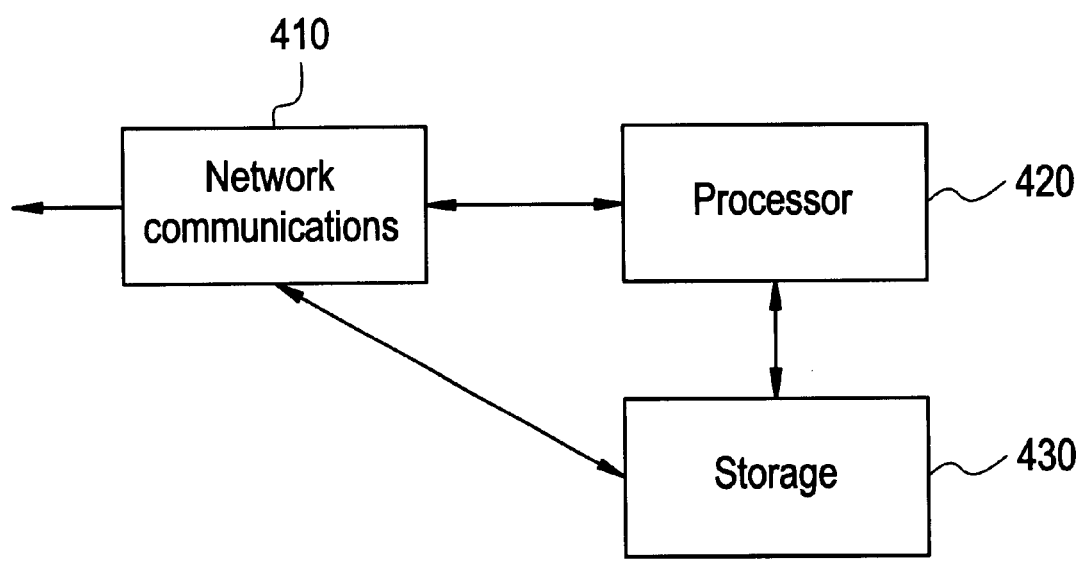
FIG. 4 shows a collision control device in accordance with the invention.

A second type of device that may be implemented on a control processor in accordance with the invention is a collision control device. The collision control device analyzes offset measurements made by an offset monitoring device. Preferably the offset monitoring device provides measurements made in the immediate vicinity of the serving base station offset as described above. In the event that a PN code collision is determined to be imminent, the collision control device initiates corrective action to avoid or minimize the impact of the collision. A collision control device is illustrated in FIG. 4. The collision control device includes a network communications device 410 for providing communications over the communications network of FIG. 1 with other network devices. The collision control device further includes a processor 420 and a storage 430. Although illustrated as a discrete physical device for purposes of explanation, the collision control device may alternatively be implemented as part of the control processor in a base station controller, part of the control processor in a base transceiver station, or another processing device of the communications network.

Figure 4A:
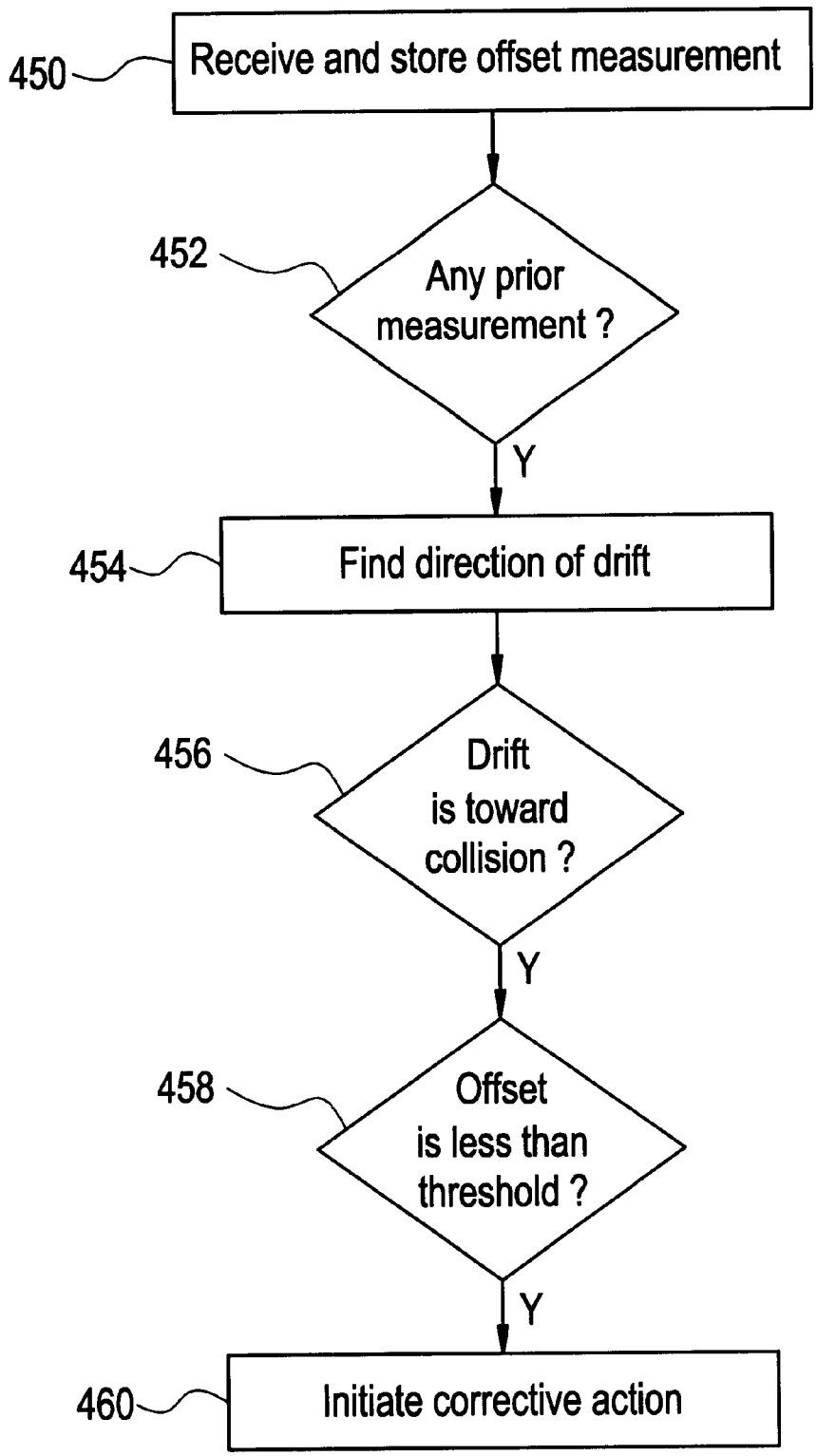
FIG. 4a shows a process in a collision control device in accordance with the invention.

A method of operating a collision control device is illustrated in FIG. 4a. This method is performed by the collision control device under the control of appropriate control programming. As shown in FIG. 4a, the collision control device receives and stores 450 offset measurements provided by offset measuring devices deployed within the network. Each offset measurement includes the identities of the reference and detected base stations. The device then determines 452 whether there are prior offset measurements for the same identified base station pair. If prior messages are found, the device determines 454, 456 the direction of drift of the two signals by subtracting the absolute value of the present measurement from the previous measurement. A negative difference between the absolute values of the offsets indicates that the signals are drifting apart. A positive difference between the absolute values of the offsets indicates that the signals are drifting toward each other. The device then determines 458 whether the most recent offset measurement is less than a predetermined threshold value for collision. If the offset is less than the threshold value, a collision state is imminent and corrective action is initiated 460.

Figure 4B:
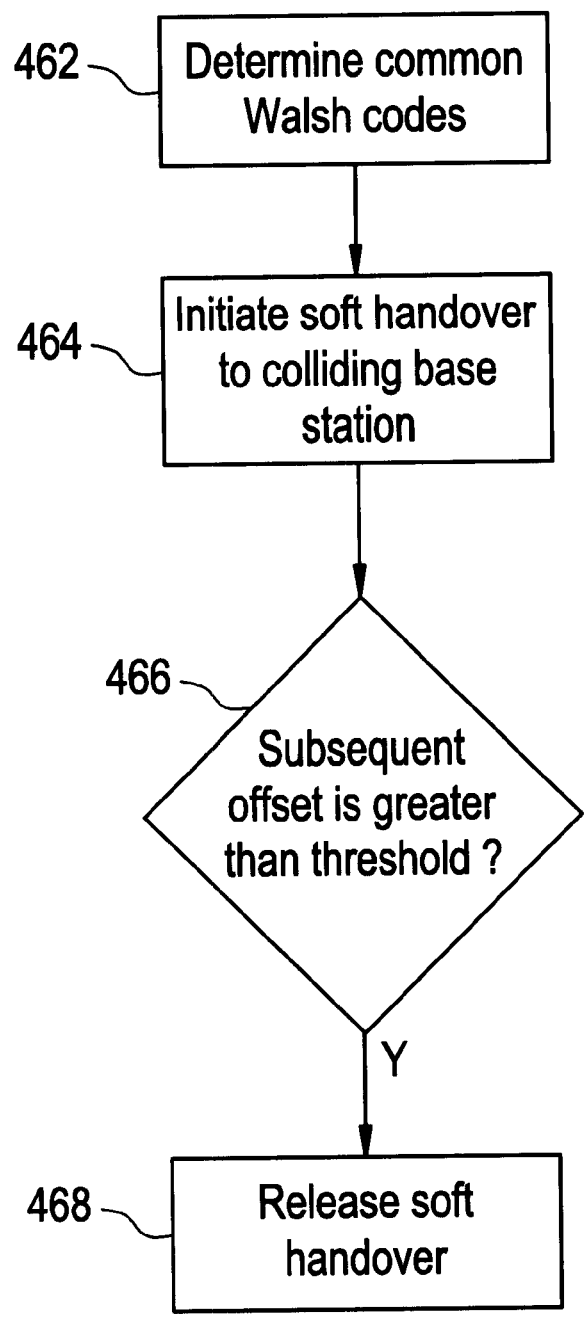
FIG. 4b shows a corrective action process in a collision control device in accordance with the invention.

One or more of several different corrective actions may be taken in accordance with the particular system implementation. A first corrective action that may be taken is to place the mobiles in soft handover. FIG. 4b shows a process in the CDMA system for taking this corrective action. As shown in FIG. 4b, the collision control device first determines 462 those Walsh codes that are being used in common by the colliding base stations. This is accomplished through queries to the serving base station and the colliding base station requesting the identities of the Walsh codes in use at each station. It will be appreciated by those skilled in the art that such communications are not standardized and will vary in accordance with implementation of the particular system in which the collision control device is included. In each case it will be determined that the pilot (Walsh code 0), the synchronization (Walsh code 32) and some of the paging channels (Walsh codes 1–7) are in common use at both base stations, while active common traffic channels will vary on a case-by-case basis. The collision control device then sends commands to the base station controllers of the respective base stations to initiate 464 soft handover of any active common traffic channels between the colliding base stations. In the event that there are many mobiles to act on, it is preferable to act first on those already known to be in the overlap coverage region and process the others secondly. The device then monitors subsequent offset measurements. When a subsequent offset measurement is determined 466 to be greater than the predetermined collision threshold, the collision control device sends commands to the base station controllers to release 468 the soft handovers of the active traffic channels. It will be noted here that, unlike present systems, the soft handover state must be maintained until the collision state has passed. Accordingly, the base station controllers must be provided with appropriate programming to maintain soft handover states commanded by a collision control device until a further command releasing the soft handover is received.

Figure 5:
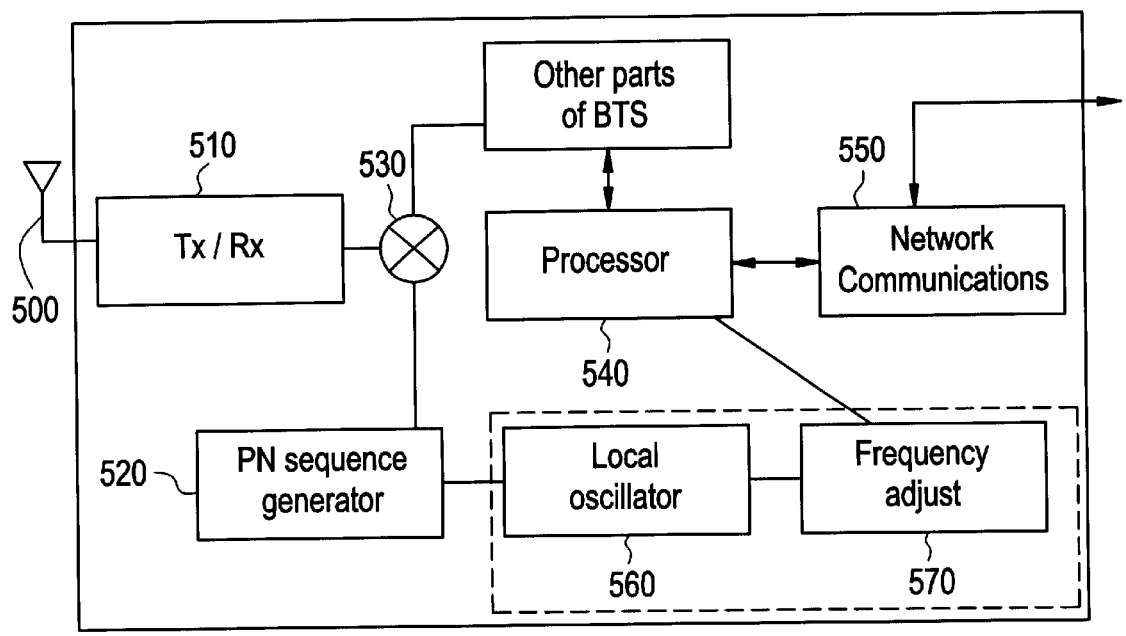
FIG. 5 shows elements of an alternative base transceiver station in accordance with the invention.

In alternative embodiments, the collision control device may initiate corrective action by sending commands to a BTS to cause the BTS to alter its oscillation speed upward or downward, so that drift towards collision is prevented, or so that the drift toward collision is increased such that the amount of time spent in collision is substantially reduced. FIG. 5 illustrates a base transceiver station designed to operate in accordance with the first of these alternative embodiments. As seen in FIG. 5, the BTS is much like a conventional BTS, including an antenna 500, transceiver 510, PN sequence generator 520, mixer 530, processor 540, and network communication device 550. In accordance with the invention, the BTS further includes an adjustable local oscillator 560 and a frequency adjust circuit 570. The frequency adjust circuit is responsive to commands relayed by the processor 540 that indicate whether the frequency of the oscillator is to be adjusted upward or downward. Such commands are generated in response to commands received by the processor through the network from the collision control device.

Figure 5A:
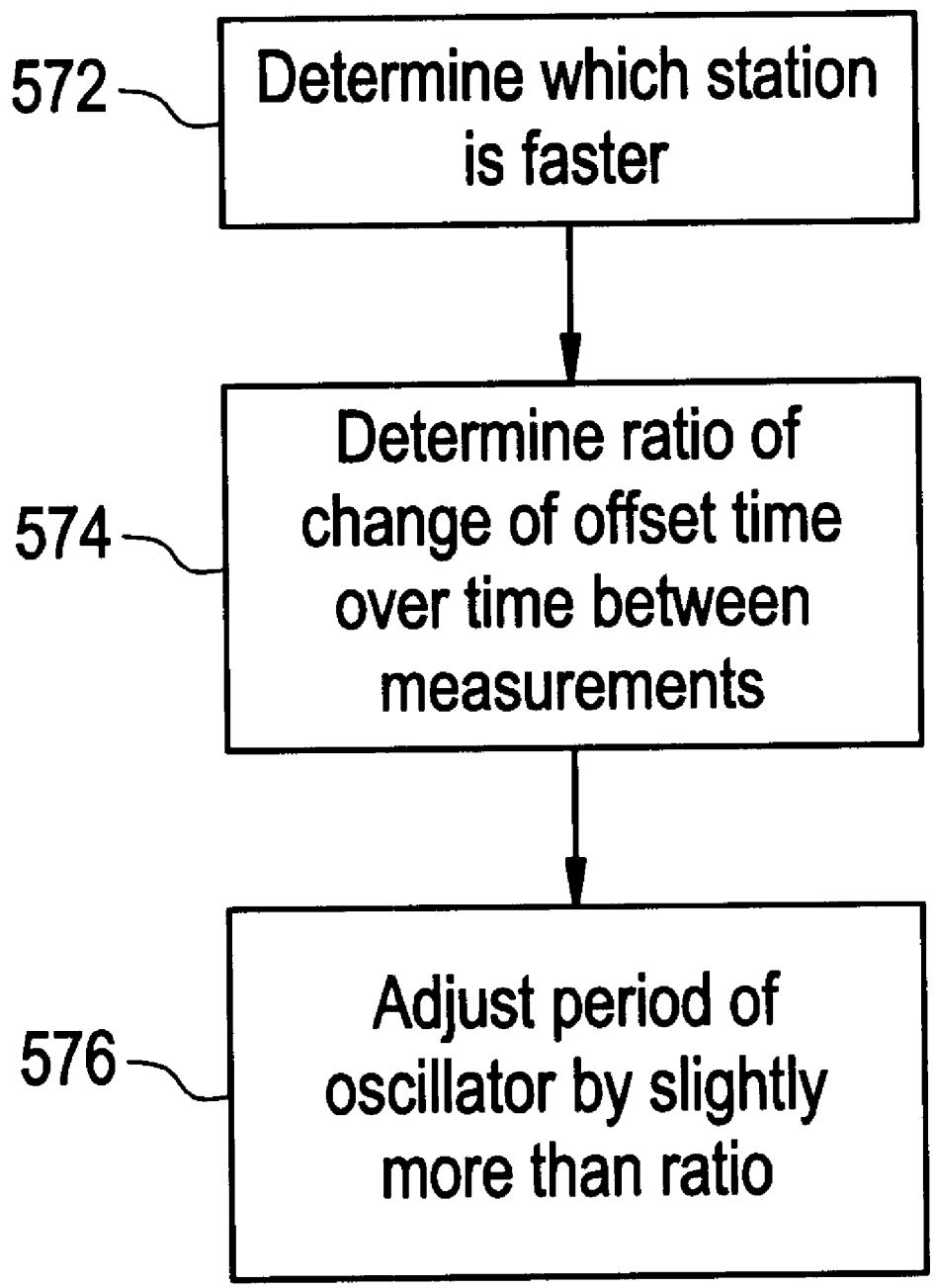
FIG. 5a shows a corrective action process in a collision control device in accordance with the invention.

A corresponding corrective action process in a collision control device is illustrated in FIG. 5a. As shown in FIG. 5a, it is first determined 572 which of the two stations is oscillating at the faster rate. This is determined by comparison of the most recent offset measurement with the previous offset measurement. If the comparison shows that the approaching signal has a later offset than the reference signal, then the reference signal is oscillating a faster rate and must be reduced. Conversely, if the comparison shows that the approaching signal has an earlier offset than the reference signal, then the reference signal is oscillating at a slower rate and must be increased. The ratio of the change in offset time to the time between measurements is then determined 574, and the period of the oscillator is adjusted by a fraction slightly larger than the ratio of the change in offset time and the measurement interval. The amount of change is made slightly larger in order to allow for the effects of errors in the measurements and the adjustment process and assure that the drift towards collision is reversed.

Figure 6:
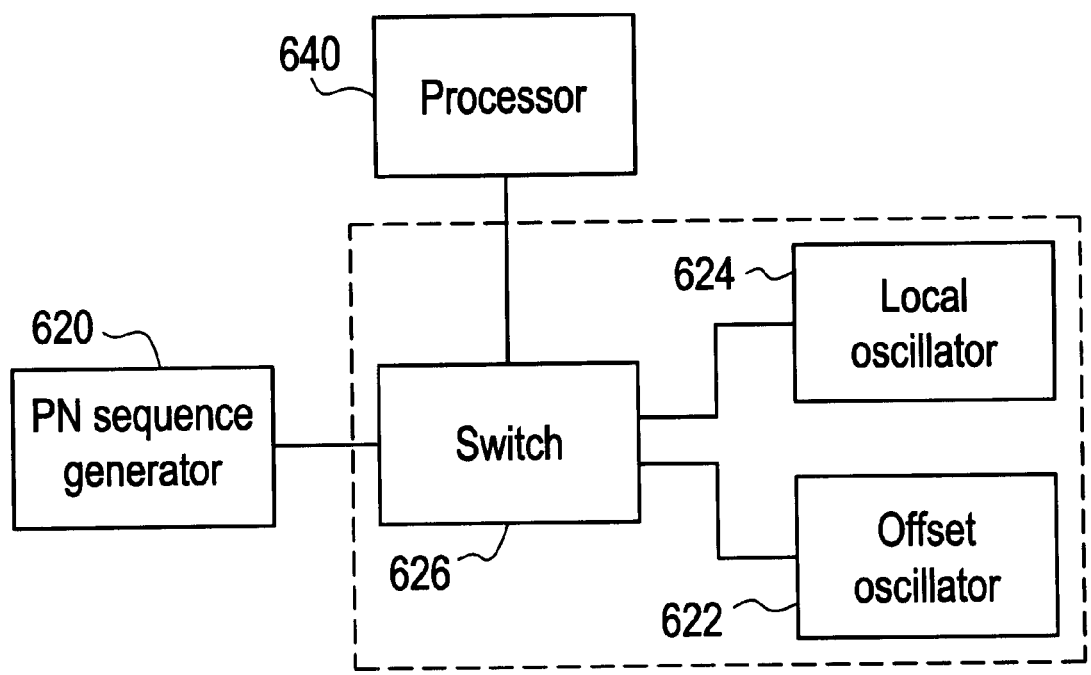
FIG. 6 shows elements of an alternative base transceiver station in accordance with the invention.

FIG. 6 shows an alternative oscillator arrangement for a base station transceiver in accordance with the second of the alternative embodiments described above. As seen in FIG. 6, the base transceiver stations includes fixed frequency default and alternate local oscillators 622, 624, and a switch 626 that is responsive to commands relayed by the processor 640 for switching between the two oscillators. The local oscillators 622, 624 have slightly different frequencies. The difference in frequency between the alternate and the main oscillator should be chosen to reduce the time spent in collision state to a few seconds. A suitable value would be about one part in a million offset from the main oscillator. This will cause the base station timing to drift through a collision zone of 10 microseconds in about 10 seconds. Accordingly, in response to commands from a collision control device, the processor may switch local oscillators to cause the PN drift of the BTS to speed up or to slow down relative to another BTS.

Figure 6A:
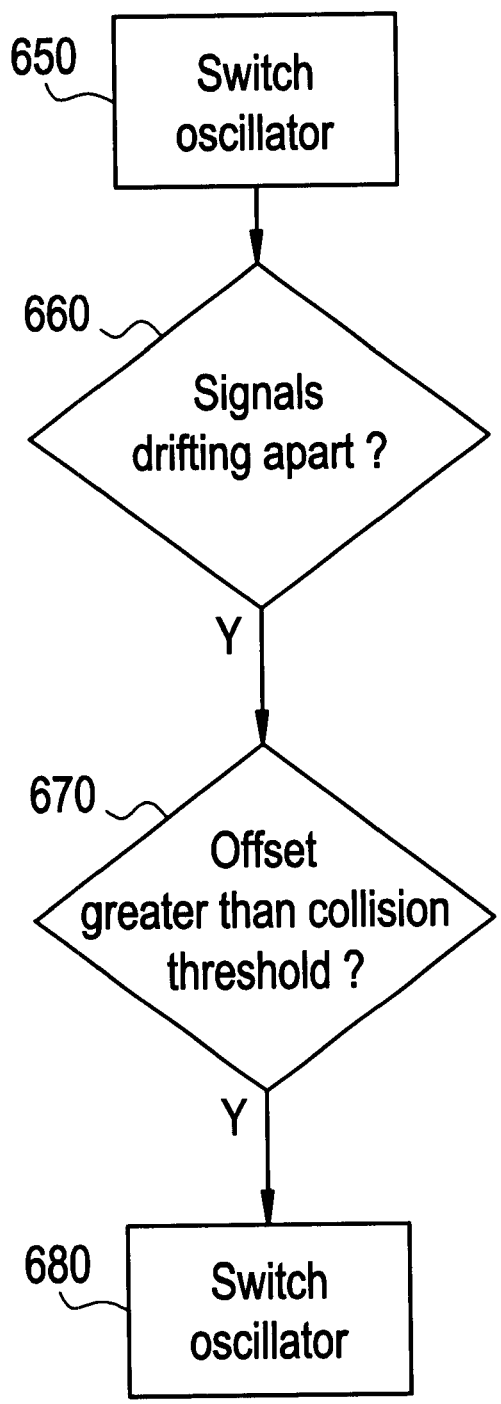
FIG. 6a shows a corrective action process in a collision control device in accordance with the invention.

A corresponding corrective action process in a collision control device is illustrated in FIG. 6a. Initially a command is issued to the serving base station to switch 650 to the alternate oscillator. Depending on the rates of the colliding oscillators, this will either reverse the direction of drift, or will accelerate the drift toward collision. While collision is generally undesirable, if the offset frequency is chosen such that the time interval while the signals from the two base stations are colliding is minimal (a few seconds) then the effect is only a minor interruption to the calls in progress before the signals drift out of collision and communications return to normal. After the oscillator is switched, the collision control device monitors subsequent offset measurements to determine whether the signals are drifting together or apart. If it is determined 660 that the signals are drifting apart, then the collision detection device continues to monitor subsequent offset measurements. When it is determined 670 that the offset between signals is greater than the collision threshold, the collision control device issues a command to switch 680 back to the default oscillator. This arrangement, while not preventing interference, makes use of simple switching apparatus in the base station and thus may be less expensive to implement than the frequency control device discussed in the alternative of FIG. 5.

As a further alternative, the corrective action may comprise a combination of the initiation of soft handover, as discussed with respect to FIG. 4b, followed by adjustment of oscillator frequency as discussed with respect to either of FIGS. 5a and 6a.

Figure 7:
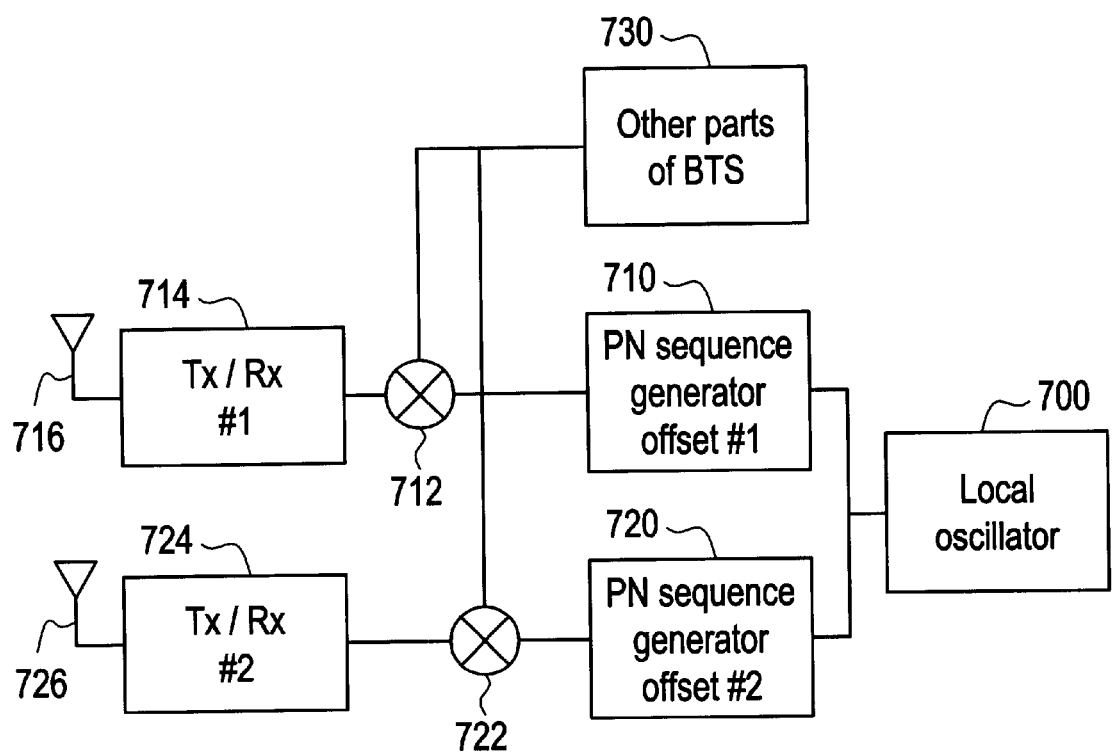
FIG. 7 shows elements of an alternative base transceiver station in accordance with the invention.

Alternative base station transceivers for avoiding signal collision are also contemplated. FIG. 7 illustrates a first alternative base transceiver station. As shown in FIG. 7, the BTS includes first and second PN sequence generators 710, 720 driven by a common local oscillator 700. The PN sequence generators 710, 720 produce the same PN code but at different offsets. Since the PN sequence generators are driven by a common local oscillator, their relative offset remains static, though both will drift by equal amounts with respect to other asynchronous base transceiver stations of the system. The PN codes are provided to corresponding mixers 712, 722 where the PN codes modulate data provided for transmission by the BTS (the physical components producing this data are the same as found in conventional base station transceivers and so are represented in FIG. 7 as "other parts" 730). The signals from each mixer are provided to corresponding transceivers 714, 724 which modulate the signals for transmission in different frequency bands. The signals may be transmitted by means of antennae 716, 726, as illustrated, or by a single antenna if desired. The BTS of FIG. 7 thereby transmits dual signals for each Walsh code that is in use, and so each of the two signals effectively has a corresponding "backup" that may be used to avoid collision.

Accordingly, in the event that a collision control device of the system detects an imminent collision, the corrective action may comprise an order to the BTS to hand over from the signal in the first signal band to its counterpart signal in the second signal band so that it tracks the signal in the band that is not in danger of collision.

The handover of the mobiles served by the base station from their current band to the alternate band may be done using the normal signaling channels and protocols provided in the radio system for this purpose. Thus the process begins with the base station initiating duplicate transmissions in the alternate band for the mobiles it is servicing that are in danger of collision. As discussed earlier it is most important that mobiles in the overlapping coverage region be acted on first. However, the base station may also be providing service to mobiles in several bands, not all of which will require corrective action. Some mobiles, for example, may already be operating in the alternate band and need no further protection. The base station need not always be transmitting the duplicate signals in the alternate band, and may choose to only provide the duplicate transmissions when a change is necessary due to an imminent collision. Once the duplicate signals for the affected mobiles are being transmitted, the mobiles can be instructed, using the normal signaling channels and message protocols of the radio system, to handover to the alternative band. Once the mobiles have successfully made the transition, the base station is commanded to stop transmitting signals in the original band (where the collision is imminent). The mobiles that have made the transition to the new band may continue to operate in that band until their calls are finished, or it is necessary for another handover to avoid a collision with other signals in that band. Even though the two signals are in separate bands, separate offsets are required because the other base station may also have signals in the same pair of bands. Using separate offsets in each band assures that the collisions will not occur simultaneously in both bands.

This arrangement requires that the base station have the capability to operate in two bands simultaneously and with differing PN code offsets. This arrangement for avoiding unsynchronized collisions has the advantage that all of the corrective actions (handover) occur within a single base station, and thus it is not necessary for the collision control unit to communicate with other base stations. This restriction may be particularly useful at the boundary of an operator's territory where the colliding base station may be part of another operator's network. This arrangement is also useful for unsynchronized single base stations operating in an otherwise synchronized deployment such as when their synchronization mechanism is unavailable due to failure.

Figure 8:
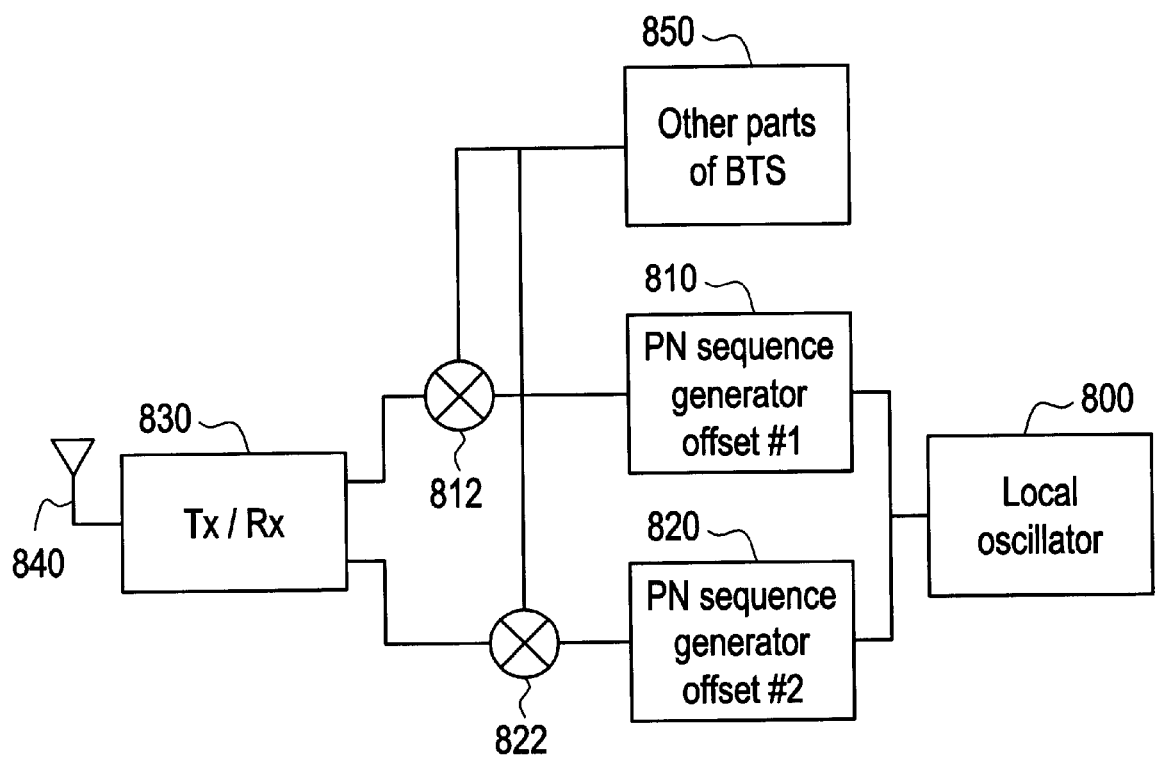
FIG. 8 shows elements of an alternative base transceiver station in accordance with the invention.

A second alternative base station transceiver in accordance with the invention is illustrated in FIG. 8. As shown in FIG. 8, the BTS includes first and second PN sequence generators 810, 820 driven by a common local oscillator 800. The PN sequence generators 810, 820 produce the same PN code but at different offsets. Since the PN sequence generators are driven by a common local oscillator, their relative offset remains static, though both will drift by equal amounts with respect to other asynchronous base transceiver stations of the system. The PN codes are provided to associated mixers 812, 822 where the PN codes modulate data provided for transmission by the BTS (as in the embodiment of FIG. 7, the physical components producing this data are the same as found in conventional base station transceivers and so are represented in FIG. 8 as "other parts" 850). The signals from each mixer are added together to form the input to a common transceiver 830 and broadcast by means of an antenna 840. The BTS of FIG. 8 may thereby transmit dual signals for each Walsh code, with each of the dual signals having different PN offsets.

Accordingly, in the event that a collision control device of the system detects an imminent collision, the corrective action may comprise an order to the BTS to hand over from first offset to the second offset of the BTS. The handover of the mobiles served by the base station from their current PN offset to the alternative may be done using the normal signaling channels and protocols provided in the radio system for this purpose. This process would begin with the base station initiating duplicate transmissions at the alternate offset for the mobiles it is servicing that are in danger of collision. As discussed earlier it is most important that mobiles in the overlapping coverage region be acted on firstly. However, the base station may also be providing service to mobiles at several offsets, not all of which will require corrective action. Some mobiles, for example, may already be operating with the alternative offset and need no further protection. The base station need not always be transmitting the duplicate signals at the two offsets, and may choose to only provide the duplicate transmissions when a change is necessary due to an imminent collision. Once the duplicate signals for the affected mobiles are being transmitted, the mobiles can be instructed, using the normal signaling channels and message protocols of the radio system, to handover to the new offset. Once the mobiles have successfully made the transition, the base station may be commanded to stop transmitting signals at the original offset (where the collision is imminent). The mobiles that have made the transition to the new offset may continue to operate at that offset until their calls are finished, or it is necessary for another handover to avoid a collision with other signals at that offset.

This arrangement requires that the base station have the capability to operate with differing PN code offsets within a single transmitter. Using the duplicate transmissions, of course, reduces the traffic capacity within the band of operation. This arrangement may be useful in deployments where the expected traffic is much less than can be accommodated in a single band and thus the loss in capacity due to the duplicate signals is not a concern. In operation, the duplicate signals need only be present during the time the handover is performed, and so they do not greatly affect the total capacity of the system. This arrangement for avoiding unsynchronized collisions has the advantage that all of the corrective actions (handover) occur within a single base station, and thus it is not necessary for the collision control unit to communicate with other base stations. This restriction may apply at the boundary of an operator's territory where the colliding base station may be part of another operator's network. This arrangement is also useful for unsynchronized single base stations operating in an otherwise synchronized deployment such as when their synchronization mechanism is unavailable due to failure.

While the specific examples discussed herein represent the best modes of the invention currently known to the inventors. Those having ordinary skill in the art will recognize a variety of ways to implement CDMA communication systems consistent with the invention as described in the summary and specific examples provided above, and as claimed in the appended claims.

What is claimed is:

1. A method for operating a control processor in an asynchronous CDMA communication system, comprising:
    periodically updating a table of instantaneous PN code offsets of base transceiver station signals;
    identifying an imminent collision of PN codes of a pair of base transceiver stations; and
    issuing a command to initiate a corrective action at one of the pair of base transceiver stations.

2. The method of claim 1, wherein identifying an imminent collision comprises determining that a most recent instantaneous offset of PN codes of the pair of base transceiver stations is less than a collision threshold.

3. The method of claim 1, wherein issuing a command to initiate a corrective action comprises issuing a command to one of said base transceiver stations to switch from a default oscillator to a secondary oscillator having a different rate than said default oscillator.

4. The method of claim 3, further comprising:
determining that a most recent instantaneous offset of the base station pair is greater than the collision threshold; and
issuing a command to said one of said base transceiver stations to switch from the secondary oscillator to the default oscillator.

5. The method of claim 1, wherein identifying an imminent collision comprises:
determining a direction of drift of PN codes of the pair of base transceiver stations; and
determining that a most recent instantaneous offset of the pair of base transceiver stations is less than a collision threshold.

6. The method of claim 5, wherein issuing a command to initiate a corrective action comprises issuing a command to one of said base transceiver stations to change its oscillator rate by a specified amount.

7. The method of claim 6, wherein said specified amount is determined from the rate of drift.

8. The method of claim 1, further comprising determining Walsh codes in common use by both of said pair of base stations, and wherein issuing a command to initiate a corrective action comprises issuing a command to one of said base transceiver stations to place into a soft handover state all mobile receivers that are using traffic channels having one of said common Walsh codes.

9. The method of claim 8, further comprising:
determining that a most recent instantaneous offset of the base station pair is greater than the collision threshold; and
issuing a command terminating said soft handover state.

10. The method of claim 1, further comprising determining Walsh codes in common use by both of said pair of base stations, and wherein issuing a command to initiate a corrective action comprises issuing a command to one of said base transceiver stations to place into a soft handover state all mobile receivers that are using traffic channels having one of said common Walsh codes, and further comprising:
issuing a command to one of said base transceiver stations to switch from a default oscillator to a secondary oscillator having a different rate than said default oscillator;
determining that a most recent instantaneous offset of the base station pair is greater than the collision threshold;
issuing a command to said one of said base transceiver stations to switch from the secondary oscillator to the default oscillator; and
issuing a command terminating said soft handover state.

11. The method of claim 8, wherein identifying an imminent collision comprises:
determining a direction of drift of PN codes of the pair of base transceiver stations; and
determining that the instantaneous offset of the pair of base transceiver stations is less than a collision threshold, and
wherein issuing a command to initiate a corrective action comprises issuing a command to one of said base transceiver stations to change its oscillator rate by a specified amount, and
wherein the method further comprises:
determining that a most recent instantaneous offset of the base station pair is greater than the collision threshold; and
terminating said soft handover state., 12. The method of claim 1, wherein issuing a command to initiate a corrective action comprises issuing a command to one of said pair of base transceiver stations to hand over mobile receivers to a second offset in a second frequency band of said base transceiver station.

13. The method of claim 1, wherein issuing a command to initiate a corrective action comprises issuing a command to one of said pair of base transceiver stations to hand over mobile receivers to a second offset of said base transceiver station.

14. A collision control device for an asynchronous CDMA communication system, comprising:
means for periodically updating a table of instantaneous PN code offsets of asynchronous base transceiver station signals;
means for identifying an imminent collision of PN codes of a pair of base transceiver stations; and
means for issuing a command to initiate a corrective action at one of the pair of base transceiver stations.

15. The device of claim 14, wherein the means for identifying an imminent collision comprises means for determining that a most recent instantaneous offset of PN codes of a pair of base transceiver stations is less than a collision threshold.

16. The device of claim 14, wherein the means for issuing a command to initiate a corrective action comprises means for issuing a command to one of said base transceiver stations to switch from a default oscillator to a secondary oscillator having a different rate than said default oscillator.

17. The device of claim 16, further comprising:
means for determining that a most recent instantaneous offset of the base station pair is greater than the collision threshold; and
means for issuing a command to said one of said base transceiver stations to switch from the secondary oscillator to the default oscillator.

18. The device of claim 14, wherein the means for identifying an imminent collision comprises:
means for determining a direction of drift of PN codes of the pair of base transceiver stations; and
means for determining that a most recent instantaneous offset of the pair of base transceiver stations is less than a collision threshold.

19. The device of claim 18, wherein the means for issuing a command to initiate a corrective action comprises means for issuing a command to one of said base transceiver stations to change its oscillator rate by a specified amount.

20. The device of claim 19, wherein said specified amount is determined from the rate of drift.

21. The device of claim 14, further comprising means for determining Walsh codes in common use by both of said pair of base stations, and wherein the means for issuing a command to initiate a corrective action comprises means for issuing a command to one of said base transceiver stations to place into a soft handover state all mobile receivers that are using traffic channels having one of said common Walsh codes.

22. The device of claim 21, further comprising:
means for determining that a most recent instantaneous offset of the base station pair is greater than the collision threshold; and
means for issuing a command terminating said soft handover state.

23. The device of claim 14, further comprising means for determining Walsh codes in common use by both of said pair of base stations, and wherein the means for issuing a command to initiate a corrective action comprises means for issuing a command to one of said base transceiver stations to place into a soft handover state all mobile receivers that are using traffic channels having one of said common Walsh codes, and further comprising:

means for issuing a command to one of said base transceiver stations to switch from a default oscillator to a secondary oscillator having a different rate than said default oscillator;

means for determining that a most recent instantaneous offset of the base station pair is greater than the collision threshold;

means for issuing a command to said one of said base transceiver stations to switch from the secondary oscillator to the default oscillator; and means for issuing a command terminating said soft handover state.

24. The device of claim 14, wherein the means for identifying an imminent collision comprises:

means for determining a direction of drift of PN codes of the pair of base transceiver stations; and means for determining that the instantaneous offset of the pair of base transceiver stations is less than a collision threshold, and wherein the means for issuing a command to initiate a corrective action comprises means for issuing a command to one of said base transceiver stations to change its oscillator rate by a specified amount, and wherein the device further comprises:

means for determining that a most recent instantaneous offset of the base station pair is greater than the collision threshold; and means for terminating said soft handover state.

25. The device of claim 14, wherein the means for issuing a command to initiate a corrective action comprises means for issuing a command to one of said pair of base transceiver stations to hand over mobile receivers to a second offset in a second frequency band of said base transceiver station.

26. The device of claim 14, wherein the means for issuing a command to initiate a corrective action comprises means for issuing a command to one of said pair of base transceiver stations to hand over mobile receivers to a second offset of said base transceiver station.

* * * * *